(No Model.)

C. H. BIDWELL.
BEAN PLANTER.

No. 557,046. Patented Mar. 24, 1896.

Witnesses

Inventor
Charles H. Bidwell
By Alexander Davis
Attorneys

UNITED STATES PATENT OFFICE.

CHARLES H. BIDWELL, OF MEDINA, NEW YORK.

BEAN-PLANTER.

SPECIFICATION forming part of Letters Patent No. 557,046, dated March 24, 1896.

Application filed December 18, 1895. Serial No. 572,566. (No model.)

*To all whom it may concern:*

Be it known that I, CHARLES H. BIDWELL, a citizen of the United States, residing at Medina, in the county of Orleans and State of New York, have invented certain new and useful Improvements in Bean-Planters, of which the following is a specification, reference being had therein to the accompanying drawings.

This invention relates to a new and improved grain-drill tooth; and it has for its object to provide a tooth by means of which the seed will be deposited at an even depth in the ground and be covered with fresh mellow earth instead of being covered with small stones, rubbish and dried clods of earth, as is the case with seed planted and covered with the ordinary drill and covering attachment.

To this end the invention consists in the novel combination and arrangement of parts hereinafter described, and particularly set forth in the claim appended.

Figure 1:
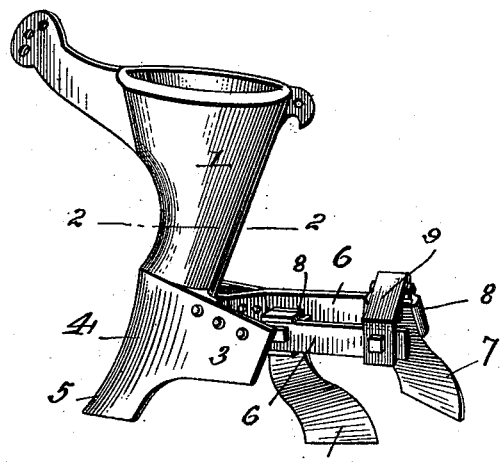
Figure 2:
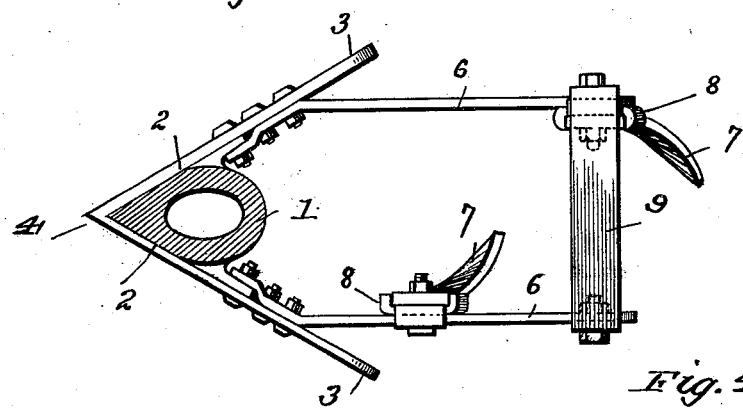
Figure 3:
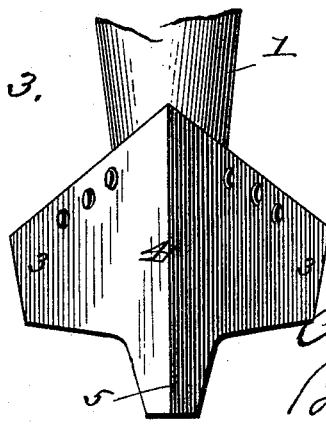
Figure 4:
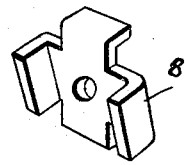

In the drawings, Figure 1 is a perspective view of the improved tooth and attachment. Fig. 2 is a horizontal sectional view thereof on line 2 2 of Fig. 1. Fig. 3 is a detail front elevation. Fig. 4 is a detail.

Referring to the various parts by numerals, 1 designates a grain-drill tooth, whose upper portion may be of any suitable construction and whose lower portion is formed V-shaped in horizontal section and comprises the rearwardly-extending diverging faces 2 2 formed integral therewith. These faces are of suitable size, and secured to them is the V-shaped opening or furrow-forming shoe 4. This shoe is formed with the depending forward portion 5, which forms the furrow into which the seed is deposited, and with the diverging rearwardly-extending wings 3 3, which do not extend down as far as the furrow-opening portion. These wings, being thus supported in a higher plane than the entering portion of the shoe and on either side thereof, serve to scrape over the surface of the earth and to level it and push aside the small stones, rubbish and dry clods of earth and leave the earth in the rear of the drill fresh and mellow and in good condition for the covering devices to operate upon.

Secured to the rear side of each of the wings of the shoe 4 is a rearwardly-extending bar 6, which extends a suitable distance to the rear of the shoe and carries a covering-blade 7. These blades 7 are secured to the inner sides of these bars by means of clips 8, which are formed with outwardly-turned top and bottom flanges which fit the respective sides of the bars, and with inwardly-turned side flanges which embrace the sides of the blades 7 at their upper ends. These blades extend inwardly and take earth from the rear of the shoe 4. The clips and the blades are secured to the bars by suitable bolts, and the two bars 6 are suitably braced together by a cross-bar 9 secured to them at their outer ends. These covering-blades may be of any suitable form. Those shown in the drawings have been found to operate satisfactorily. These covering-blades may be carried by a separated standard and be made independent of the drill shoe and spout, or, if desired, the shoe and covers may be secured together and be carried independently of the drill-spout.

It will thus be seen that by the use of my improved drill seed will be planted at an even depth in the soil, will be covered by fresh mellow earth which is taken from the rear of the leveling and clearing wings 3 3, and will therefore grow in even rows, making it possible to use a weeding-machine with safety to the young plants, and that the stones and rubbish will be pushed away from the rows of seed by the wings 3 of the shoe.

From the foregoing it is manifest that I produce a seed-planting attachment for grain-drills which insures an even and proper planting of the seed. It will also be seen that while the device is especially designed for planting beans it is adapted for planting any other seed.

Having thus fully described my invention, what I claim is—

In a seed-planting attachment for grain-drills, the combination of a seed-spout, a shoe adapted to form the furrow, a pair of wings carried by said shoe and diverging outwardly and rearwardly therefrom on either side thereof and being supported above the plane of the furrow-forming portion of the shoe, and lying in an approximately horizontal position, whereby they shall serve to scrape the surface of the soil while the furrow-forming part is working down in the furrow, and covering devices operating in the rear of and within the path of said wings and below the same, and means for supporting the shoe and the covering devices, substantially as described.

In testimony whereof I affix my signature in presence of two witnesses.

CHAS. H. BIDWELL.

Witnesses:
G. E. WADLEIGH,
WM. U. SEE.